United States Patent [19]
Belart et al.

[11] Patent Number: 4,492,413
[45] Date of Patent: Jan. 8, 1985

[54] CONTROL ARRANGEMENT FOR AN ANTISKID HYDRAULIC BRAKING SYSTEM OF A VEHICLE

[75] Inventors: Juan Belart, Walldorf; Jochen Burgdorf, Offenbach-Rumpenheim; Dieter Kircher, Frankfurt am Main; Lutz Weise, Mainz, all of Fed. Rep. of Germany

[73] Assignee: ITT Industries, Inc., New York, N.Y.

[21] Appl. No.: 315,820

[22] Filed: Oct. 28, 1981

[30] Foreign Application Priority Data

Oct. 28, 1980 [DE] Fed. Rep. of Germany ....... 3040548

[51] Int. Cl.$^3$ .............................................. B60T 8/02
[52] U.S. Cl. ..................................... 303/92; 303/114; 303/119
[58] Field of Search ................. 303/114, 113, 115, 50, 303/116, 52, 117, 119, 61–63, 68–69, 92, 6 R, 10–12, 13, 111, 14, 2, 3; 188/181, 345, 352; 60/561, 581, 582, 548

[56] References Cited

U.S. PATENT DOCUMENTS

| 3,503,655 | 3/1970 | Heimler | 303/114 |
| 3,999,808 | 12/1976 | Belart | 303/92 X |
| 4,264,109 | 4/1981 | Knox et al. | 303/119 X |
| 4,340,257 | 7/1982 | Belart | 303/119 X |
| 4,354,714 | 10/1982 | Belart | 303/119 X |
| 4,362,339 | 12/1982 | Belart | 303/113 X |

FOREIGN PATENT DOCUMENTS

| 2202998 | 7/1973 | Fed. Rep. of Germany . |
| 2425326 | 1/1975 | Fed. Rep. of Germany . |
| 2351488 | 4/1975 | Fed. Rep. of Germany . |
| 2401418 | 7/1975 | Fed. Rep. of Germany . |
| 2519835 | 11/1976 | Fed. Rep. of Germany . |

Primary Examiner—Douglas C. Butler
Attorney, Agent, or Firm—James B. Raden; William J. Michals

[57] ABSTRACT

A control arrangement for use in a hydraulic braking system equipped with an antiskid control device and an auxiliary energy source and including a master cylinder device which is operated in dependence on the travel of a brake pedal, includes normally open separating valves in braking conduits to the wheel brake actuating cylinders, which close during antiskid control operation, provided that auxiliary energy is available. An auxiliary supply conduit supplies the auxiliary energy to the wheel brake actuating cylinders so that the latter can be operated in a dynamic manner. A normally closed return valve is interposed in the return conduit from the respective wheel brake actuating cylinders and can be opened, either directly or indirectly, by the auxiliary energy during the antiskid control operation, so that the pressure from the wheel brake operating cylinder to be controlled can be relieved to the low-pressure supply reservoir while rendering static operation of the wheel brake actuating cylinders possible in its normal closed position assumed when no antiskid control action is needed. The pressure of the auxiliary energy hydraulic fluid can be generated by a hydraulic pump which is operated only during the antiskid control action, or the auxiliary energy supply system can be operated on a continuous basis, in which case the auxiliary hydraulic fluid is supplied to the hydraulic braking circuit only when the need for an antiskid control action arises.

28 Claims, 4 Drawing Figures

CONTROL ARRANGEMENT FOR AN ANTISKID HYDRAULIC BRAKING SYSTEM OF A VEHICLE

BACKGROUND OF THE INVENTION

The present invention relates to a control arrangement for use in a hydraulic braking system of a vehicle in general, and more particularly in a hydraulic braking system of a motor vehicle equipped with an antiskid control device.

There are already known control arrangements of this type for use in antiskid hydraulic braking systems of motor vehicles, wherein a master cylinder device operated in dependence on the travel of a brake pedal is used for controlling the operation of the wheel brake actuating cylinders in a static manner, wherein an antiskid control valve arrangement is interposed in the supply conduit between the working compartment of the master cylinder device and the associated wheel brake actuating cylinders and is operative for controlling the braking pressure especially during the antiskid control action, wherein a hydraulically actuatable return valve is interposed in a return conduit from the wheel brake actuating cylinders to a low-pressure supply reservoir, and wherein an auxiliary energy source is provided for supplying pressurized hydraulic fluid to the wheel brake actuating cylinders during the antiskid control action.

One construction of such a hydraulic braking system incorporating a control arrangement of this type is known from the published German application No. DE-OS 24 43 545. This conventional hydraulic braking system includes an auxiliary energy source which includes a pressure accumulator which makes auxiliary energy available on a continuous basis. A control valve device is arranged in front of the master cylinder device as considered in the direction of the application of the brake pedal force. This control valve device supplies the auxiliary energy to the master cylinder device to be forwarded by the latter to the associated wheel brake actuating cylinders during a braking operation. Under these circumstances, the master piston of the master cylinder device, which is sealed in a bore of the master cylinder housing accommodating the same by a sleeve-shaped lip seal, moves across and beyond a compensating port and it can assume any intermediate position during antiskid control action so that pressure from the auxiliary energy source is constantly superimposed on the pressure developed on the static braking circuit. As a result of this construction, no monitoring of the sleeve-shaped lip seal for leakage can take place either during the normal braking without antiskid control action, or during braking with antiskid control action, since any leakage past the seal would have to take place against the pressure supplied by the auxiliary source. In other words, it is impossible to recognize, so long as the auxiliary energy source is operational, whether the pressure built up in the respective braking circuit is attributable to the compression of the hydraulic fluid by the master piston itself, that is, to the so-called static operation of the master piston, or to the operation of the auxiliary pressure source, that is, to the so-called dynamic pressure. This could be very dangerous in the event that auxiliary energy source fails since, should the lip seal of the master piston be defective there would be no pressure build up in the working chamber of the master cylinder device and hence in the braking circuit, so that not only the braking action attributable to the operation of the auxiliary energy source, but also that attributable solely to the operation of the master cylinder device would be lost and no braking could be accomplished. A further disadvantage of this conventional arrangement is that it can only be used in combination with a hydraulic brake force booster and that a considerable amount of auxiliary energy must be made available, inasmuch as the braking action occurs at least partially dynamically even in the absence of the antiskid control action. This means that the braking system has a power loss of a considerable magnitude, and that the auxiliary energy supply system must have correspondingly large dimensions.

SUMMARY OF THE INVENTION

Accordingly, it is a general object of the present invention to avoid the disadvantages of the prior art.

More particularly, it is an object of the invention to provide a control arrangement for use in a hydraulic braking system of a motor vehicle equipped with an antiskid control device, which is not possessed of the disadvantages of the control arrangements of this type.

Still another object of the present invention is to so construct the arrangement of the type here under consideration as to operate with only minimum, if any energy loss.

It is still another object of the present invention to so design the control arrangement as to be able to detect the occurrence of a leakage past a seal of a master piston of a master cylinder device even when an auxiliary pressure or energy source is fully operational.

A concomitant object of the present invention is to develop a control arrangement for use in the above-mentioned hydraulic braking system, which is simple in construction, inexpensive to manufacture, and reliable in operation nevertheless.

In pursuance of these objects and others which will become apparent hereafter, one feature of the present invention resides in a control arrangement for use in a hydraulic braking system of a vehicle, particularly of a motor vehicle, equipped with an antiskid control device, for controlling the operation of at least one brake actuating cylinder interposed in a braking system between a supply conduit having a first and a second branch respectively communicating with a master cylinder device having at least one master piston and an auxiliary pressure source at their upstream end and merging with one another upstream of the brake actuating cylinder and a return conduit connected to a supply reservoir at its downstream end, in dependence on the operation of the antiskid control device and of the auxiliary energy source, the control arrangement comprising, briefly stated, means for hydraulically separating the brake actuating cylinder from the master cylinder device during antiskid control action, including a separating valve interposed in the first branch of the supply conduit and assuming its open position in the absence of antiskid control action and its closed position during antiskid control action and when the auxiliary source is operational; and means for hydraulically connecting the brake actuating cylinder to the auxiliary energy source during antiskid control action, including a check valve interposed in the second branch of the supply conduit and assuming its open position when the pressure prevailing upstream thereof exceeds that prevailing downstream of the same.

Advantageously, the control arrangement further comprises means for controlling the flow of hydraulic fluid through the return conduit, including a return valve interposed in the return conduit and assuming its open position only when the auxiliary energy is operational and at least during antiskid control action.

When the control arrangement is constructed in this manner, it is achieved that the master cylinder controls the operation of the wheel brake actuating cylinders in a static manner during normal braking operation, so that no auxiliary energy need be consumed under these circumstances. Also, during such normal braking operation, that is, without antiskid control action, the sealing effect of the seal of the respective master piston can be determined. When braking conditions occur under which antiskid control action is called for, a hydraulic pump forming a part of the auxiliary energy source may be energized or at least a part of a pressurized hydraulic fluid supplied by a hydraulic pump can be diverted into the hydraulic braking system and, in this manner, the pressure in the auxiliary energy supply conduit and, ultimately, in the individual wheel brake actuating cylinders, can be built up. Simultaneously, the pressure of the auxiliary energy hydraulic fluid operates the separating valve, so that communication through the static braking conduit from the master cylinder device is interrupted, and the return valve is switched into its open position so that communication is established through the return conduit between the wheel brake actuating cylinders which are to be subjected to the antiskid control action and the supply reservoir so that the hydraulic fluid discharged from the controlled wheel brake actuating cylinders can flow into the supply reservoir. Once the antiskid control action is discontinued, the operation of the hydraulic pump or the supply of the pressurized auxiliary energy hydraulic fluid is terminated so that the pressure of the auxiliary energy source acting in the braking system decreases which permits the separating valve and the return valve to return to their respective initial positions, so that normal braking operation with a static control of the wheel brake actuating cylinders can take place again. It may be seen from the above explanation that, when the construction according to the present invention is being used, the auxiliary energy fluid needs to be made available only in the rather rare instance when antiskid control operation is to be preformed. As a result of this, the auxiliary energy supply system can have relatively small dimensions. Because of the infrequent operation of the hydraulic pump, or diversion of the pressurized hydraulic fluid from the auxiliary source to the braking system practically no energy loss is encountered in the braking system, so that the braking system can be operated in a very energy-saving manner.

Advantageously, the valves which are to be operated hydraulically in dependence on the pressure delivered by the auxiliary energy source are combined into structural units. A particular advantage of the arrangement of the present invention is that already existing braking systems can easily be refurbished or rebuilt to use the arrangement of the present invention, inasmuch as the antiskid control system is independent of the construction of the used master cylinder device so that it is not important whether the master cylinder device is constructed, for instance, as a simple master cylinder, a tandem master cylinder or a stepped piston master cylinder. Furthermore, the master cylinder device is completely separated from the wheel brake actuating cylinders during the antiskid control action so that any feedback influence of the dynamic pressure on the position of the braking pedal or on the brake pedal seal is eliminated. When the auxiliary pressure source fails, the normal function of the master cylinder device is preserved. The valves which are hydraulically controlled in dependence on the pressure delivered by the auxiliary energy source assure that a volume reserve remains in the hydraulic braking system not only in the event that the supply of the auxiliary energy fails but also when a malfunction occurs in one braking cirucit in a braking system having a plurality of braking circuits. The arrangement of the present invention is especially suited for use in a passenger cars of the subcompact or compact category. A further advantage of this hydraulic braking system is that it can be operated independently of any hydraulic braking force boosting.

A further advantageous development of the control arrangement of the present invention is obtained when means are provided for directly subjecting the return valve to the pressure of the auxiliary energy source at least during antiskid control action.

In an alternative, the control arrangement of the present invention may comprise means for indirectly subjecting the return valve to the pressure of the auxiliary energy source at least during antiskid control action. In this connection, it is especially advantageous when the return valve is constructed as a electromagnetically operable valve, and when the indirectly subjecting means is operative for operating the electromagnetically operable return valve in dependence on the pressure supplied by the auxiliary energy source.

Advantageously, the control further comprises a hydraulic pump having an input conmmunicating with the supply reservoir and an output communicating with the auxiliary pressure source, that is, with the pressure accumulator or with the auxiliary pressure supply conduit itself. Thus, this hydraulic pump, by forming a part of the control arrangement, is dedicated to the hydraulic braking system in that it supplies pressurized hydraulic fluid only to the latter. Under these circumstances, it is advantageous when the hydraulic pump is operated only during an antiskid control action, that is, commencing at the earliest at the moment when it is established that a locked condition of at least one of the vehicle wheels is imminent. However, in a vehicle having additional hydraulically operated equipment, the hydraulic pump is not dedicated in the above-mentioned manner, but rather is shared by the hydraulic braking system and such additional equipment. Under these circumstances, the hydraulic pump can be operated on a continuous basis or, when a pressure accumulator is provided, on an intermittent basis, the operation of this pump being so controlled so as to maintain the pressure in the pressure accumulator within predetermined limits. Then the supply of the pressurized hydraulic fluid from the pump or from the pressure accumulator to the braking system is preferably interrupted at all other times but during the antiskid control action.

According to a further facet of the present invention, which is intended for use in a hydraulic braking system including at least one additional braking circuit similar to the one braking circuit and incorporating at least one additional brake actuating cylinder and in which the master cylinder is constructed as a tandem master cylinder, an additional separating valve similar to the aforementioned separating valve is provided which is interposed in the additional braking circuit. In this particular construction, it is further advantageous when the return conduits of the two braking circuits merge upstream of the supply reservoir into a common return conduit section, and when the return valve is interposed in the common return section. However, it is also advantageous when a separate additional return valve similar to aforementioned return valve is interposed in the return conduit of the additional braking circuit.

A particularly advantageous construction is obtained when the separating valve includes a housing having a valve seat and a spring-loaded piston movably accommodated in the housing and having one end portion of a substantially conical configuration cooperating with the valve seat to form a conical valve therewith. It is further advantageous when the return valve includes a housing having a valve seat and a spring-loaded piston movably accommodated in the housing and having one end portion of a substantially conical configuration cooperating with the valve seat to form a conical valve therewith. A particularly compact and inexpensive arrangement is obtained when the return valves are integrated in a common valve unit. Then, the valve unit may include a housing having two oppositely situated valve seats and a single spring-loaded valve member movably accommodated in the housing and having two end portions each having a substantially conical configuration and cooperating with one of the valves seats to form a conical valve therewith.

In accordance with an additional facet of the present invention, the control arrangement further comprises a switching valve interposed between an upstream and a downstream section of the second branch of the supply conduit and having a return port connected to the supply reservoir, the switching valve being movable between a first position in which it establishes communication between the sections and a second position in which it establishes communication between the upstream section of the second branch and the return port. Advantageously, there is futher provided means for holding the switching valve in the second position thereof during braking action. The switching valve may be integrated into the master cylinder device and include a conical valve member movable relative to the master piston towards its second position in response to movement of the master piston out of its rest position.

The control arrangement of the present invention can be particularly easily installed in already existing braking systems being refurbished when the switching valve is constructed as a separate hydraulically operable valve, and when means is provided for admitting hydraulic fluids from the master cylinder device to the hydraulically operable valve for urging the latter towards its second position in dependence on the pressure prevailing in the master cylinder device. The hydraulically operable separate switching valve advantageously includes a housing having a valve seat and a switching piston movably accommodated in the housing and having one end portion of a substantially conical configuration cooperating with the valve seat to form a conical valve therewith.

The switching valve advantageously further includes a spring which urges the switching piston of the switching valve toward the second position thereof. The spring, especially a compression spring, is prefereably so dimensioned that the switching piston of the switching valve will establish communication to the low-pressure hydraulic reservoir after the termination of the antiskid control operation as well as the brake actuation so as to reduce the magnitude of the pressure remaining in the auxiliary energy system.

When the control arrangement is to be used in a hydraulic braking system including at least one additional braking cirucit similar to the one braking circuit and incorporating at least one additional brake actuating cylinder, in which the master cylinder device is con structed as a tandem master cylinder, and in which a separate auxiliary energy source is provided for each of the braking circuits, a separate hydraulic pump is advantageously provided for each of the braking circuit, the pump being interposed between the supply reservoir and the respective auxiliary energy source, there also being provided an additional switching valve similar to the aforementioned switching valve and interposed in the additional braking circuit.

It is also advantageous when there is provided means for holding the switching valve in the first position thereof so long as the pressure prevailing in the master cylinder device, which is proportionate to the brake pedal operating force, exceeds the pressure of the auxiliary energy source. In this manner, any pressure peaks of a hydraulic pump which is operated during the antiskid control operation can be reduced.

For use of the control arrangement in a hydraulic braking system operated by a brake pedal disposed at one end of the master cylinder device, it is advantageous when the switching valve is integrated into the master cyinder device at its one end and is constructed as a pedal-actuatable throttling valve. Then, the return port advantageously includes a passage in the master piston having an end facing toward the brake pedal and means for communicating the passage with the supply reservoir, while the throttling valve includes a valve seat at the one end of the passage and a throttling valve member mechanically connected to the brake and movable toward and away from the valve seat in dependence on the brake pedal travel. The throttling valve member of this construction preferably has a portion of a substantially frusto-conical configuration cooperating with the valve seat. It is further advantageous when spring means is provided for urging the throttling valve member away from the valve seat.

In this context, it is further advantageous when the master cylinder device has a bore accommodating the master piston and the throttling valve member when the communicating means of the return port includes means for defining in the bore a switching compartment receiving the throttling valve member and a return compartment situated at the other end of the passage, such defining means including a extension of the master piston toward the throttling valve member, the extension having an enlarged end portion sealingly separating the compartments from one another and provided with the aforementioned passage.

BRIEF DESCRIPTION OF THE DRAWING

Above-mentioned and other features and objects of this invention will become more apparent by reference to the following description taken in conjunction with the accompanying drawing, in which.

DETAILED DESCRIPTION OF THE PREFERRED EMBODIMENT

Figure 1:
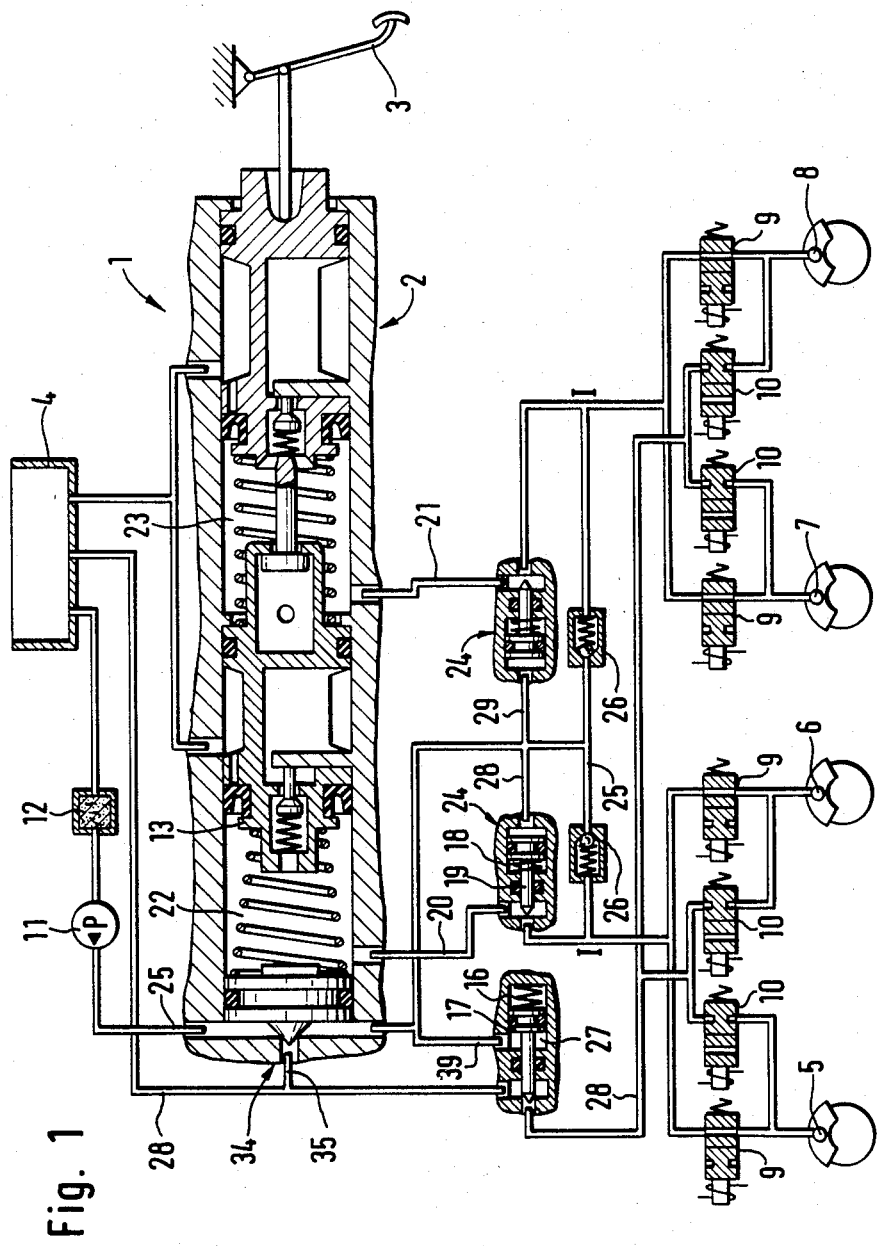
FIG. 1 is a partially sectioned partially diagramatic view of a control arrangement according to the present invention as embodied in a hydraulic braking system of a vehicle.

Referring now to the drawing in detail and first to FIG. 1 thereof, it may be seen that the reference numeral 1 has been used to identify a control arrangement for use in a vehicular hydraulic braking system in its entirety. The control arrangment 1 includes a master cylinder device 2 which, in FIG. 1, is constructed as a tandem master cylinder. The master cylinder device 2 can be operated, in a conventional manner, by a brake pedal 3. The master cylinder device 2 defines two working compartments 22 and 23 in which pressure builds up in response to the depression of the brake pedal 3 this built-up pressure serving for static control of the operation of respective wheel brake operating cylinders 5,6, 7, and 8. As shown in FIG. 1, the wheel brake actuating cylinders 5 and 6, on the one hand, and the wheel brake actuating cylinders 7 and 8, on the other hand, are arranged in separate braking circuits which are supplied with pressurized hydraulic braking fluid in response to brake pedal depression through respective separate brake conduits 20 and 21. The wheel brake actuating cylinders 5 and 6 are associated with wheels disposed along one diagonal of the vehicle, while the wheel brake actuating cylinders 7 and 8 are associated with the wheels arranged along the other diagonal of the vehicle. Each of the wheel brake actuating cylinders 5, 6, 7 and 8 is connected, at its downstream side, with a return conduit 28 which leads to a low-pressure supply reservoir 4.

Normally open, electromagnetically actuatable two-port two-position valves 9 are arranged in the two brake conduits 20 and 21 in association with the respective wheel brake actuating cylinders 5 to 8. Furthermore, normally closed electromagnetically actuatable two-port two-position valves 10 are arranged in the return conduit 28 in association with the individual wheel brake actuating cylinders 5 to 8. The operation of the control valves 9 and 10 is controlled by an antiskid control unit which is of a conventional construction and hence has not been shown in the drawing. During antiskid control action, the antiskid control unit will so operate the control valves 9 and 10, when it is detected that impermissibly high slippage values occur between the vehicle tire or tires and the roadway, that pressure in the respective wheel brake actuating cylinders 5 to 8 is reduced to a level at which the slippage is reduced into the acceptable range. Furthermore, each brake conduit 20 or 21 incorporates, between the master cylinder device 2 and the control valves 9, a separating valve 24 which includes a separating piston 19 that is axially movable in a housing. One end of the separating piston 19 is configured as a conical valve member, while the other end of the separating piston 19 is acted upon by an inner compression spring 18 which reacts at its other end against the housing and which urges the separating piston 19 in its opening direction.

Downstream of each separating valve 24 and upstream of the associated control valve 9, each of the brake conduits 20, 21 is provided with a juncture I at which an auxiliary supply conduit 25 opens into the respective brake conduit 20 or 21. The conduit 25 is connected with the low-pressure supply reservoir 4 and incorporates downstream of the supply reservoir 4, a filtering unit 12 and a hydraulic pump 11.

The auxiliary energy supply conduit 25 is provided, at the region of the juncture I to the respective brake conduit 20 or 21, with a one-way or check valve 26 which opens in a direction to the associated wheel brake actuating cylinders 5 to 8. The auxiliary energy supply conduit 25 further includes a branch conduits 29 which lead to the separating valves 24. The branch conduits 29 open into the respective separating valves 24 at the end faces thereof, being connected in this manner with an internal space of the respective separating valve 24 which faces away from the end of the separating piston 19 which is provided with the conical valve member. The auxiliary energy supply conduit 25 further passes, downstream of the hydraulic pump 11, through a further valve 34 which is arranged at that end of the master cylinder device 2 which is remote from the brake pedal 3.

The valve 34 is provided with a connecting port for a return conduit branch 35 which leads to the return conduit 28. As illustrated in FIG. 1, the valve 34 is constructed as a conical valve which switches over in response to the depression of the brake pedal 3 and thus discontinues the connection to the return conduit branch 35, while the communication through the auxiliary energy supply conduit 25 is maintained. Conversely, when the brake pedal 3 is released, the conical valve 34 establishes connection with the return conduit branch 35.

A return valve 27 is interposed in the return conduit 28. The construction of the return valve 27 is similar to that of the separating valve 24. Hence, the return valve 27 includes a return piston 17 having a conical valve, and a compression spring 16 is provided which urges the return piston 17 into its closing position in which it obstructs the return conduit 28. A further conduit branch 39 leads from the auxiliary energy supply conduit 25 to the return valve 27 so that, when an elevated pressure exists in the conduit branch 39, it is admitted into an internal space of the return valve 27 to act on the return piston 17 and to urge the same against the force of the compression spring 16 into its open position.

Having so described the construction of the control arrangement as depicted in FIG. 1, the operation thereof will now be explained.

When the brake pedal 3 is depressed during a braking operation in the leftward direction as seen in FIG. 1, a pressure build-up takes place in the working compartments 22 and 23 of the master cylinder device and, simultaneously therewith, the conical valve 34 is switched into its position in which it obstructs the connection with the return conduit branch 35. The separating valves 24 of the two brake conduits 20 and 21 as well as the return valve 27 assume their illustrated positions, so that the wheel brake actuating cylinders 5 and 6 or 7 and 8 are controlled in a static manner. The generated braking pressure cannot escape into the auxiliary energy supply conduit, inasmuch as the one-way or check valves 26 do not permit flow of the hydraulic fluid in this direction.

During an antiskid control action which is initiated when it is determined that one or more of the vehicle wheels has a tendency to lock, the aforementioned antiskid control unit or device causes the motor-driven hydraulic pump 11 to commence its operation, so that pressure builds up in the auxiliary energy supply conduit 25. As this pressure increases above a predetermined threshold, it causes the separating valves 24 to switch over into their closing positions, and the return valve 27 to switch into its open position. As a result of the closing of the brake conduits 20 and 21 by the separating valves 24, the master cylinder device 2 is hydraulically separated from the wheel brake actuating cylinders 5 to 8. As a consequence thereof, a further depression of the braking pedal 3 is no longer possible. The pressure of the auxiliary energy propagates through the one-way valves 26 to the individual wheel brake actuating cylinders 5 to 8 for dynamically controlling the operation thereof. At the same time, the electromagnetically operable control valves 9 and 10 are operated by the non-illustrated antiskid control unit in a manner which is conventional and which depends on the character of the problem to be dealt with, that is, on the situation encountered at the respective wheels being braked. When the antiskid control operation is terminated, the hydraulic pump 11 is switched off, so that the pressure in auxiliary supply conduit 25 drops and the separating valves 24 as well as the return valve 27 are returned by the forces of the respective compression springs 18 and 16 into their illustrated initial positions. As a result of this, the wheel brake actuating cylinders can once more be statically operated by the master cylinder device 2. When the braking pedal 3 is released, the conical valve 34 opens and thus establishes communication with the return conduit branch 35 to the low-pressure supply reservoir 4, so that pressure which remains in the auxiliary energy supply conduit 25 is reduced.

When one of the static braking circuits fails, the operation of the still operational other braking circuits is preserved in the same manner as known in the prior art.

In this manner, there is provided a circulation system which produces a regulated pressure during the antiskid braking operation. During the antiskid control action, the static braking circuits are superimposed or replaced by the dynamic circuits. The valves which are hydraulically operated in dependence on the pump pressure assure the presence of a volume reserve in the braking circuit in the event that that auxiliary energy source fails or when one of the braking circuits becomes defective. Under some circumstances, the hydraulically controlled valves can also be electromagnetically controlled. The control arrangement 1 of FIG. 1 operates at a pressure level of 150 bar maximum which results in a low power consumption, and the control arrangement as a whole has a low weight and takes a small amount of space. During the antiskid braking operation, the tandem master cylinder 2 is not additionally loaded and thus not permit any movement of the brake pedal 3. The pressure fluctuation at the magnetic valves are only minimal.

Figure 2:
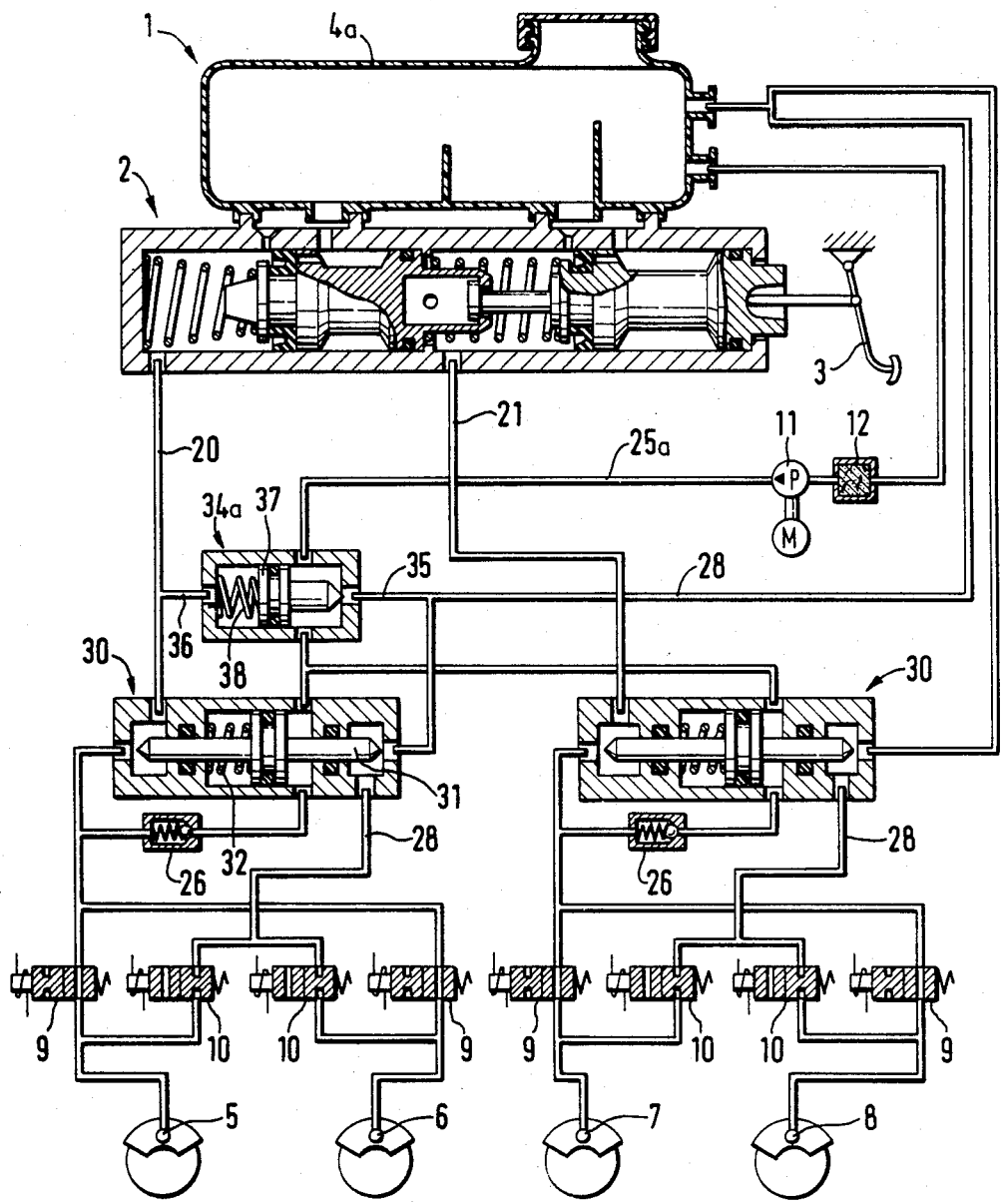
FIG. 2 is a view similar to FIG. 1 but showing a modification of the construction of the control arrangement.

The construction of the control arrangement 1 illustrated in FIG. 2 is similar to that discussed above in connection with FIG. 1 in so many respects that corresponding components have been identified by the same reference numerals.

In contradistinction to the above-discussed construction, a separate valve unit 30 is provided in the construction of FIG. 2 for each brake conduit 20 or 21. The valve unit 30 incorporates the separating valve 24 and the return valve 27 of the construction of FIG. 1 in a single unitary structure. Consequently, there is provided a switching piston 31 which has two conical valve ends. The switching piston 31 is urged by an inner spring 32 which reacts against the valve housing, in an axial direction, in such a manner that the return conduit 28 is obstructed and the first brake conduit 20 or the second brake conduit 21 is open so long as no elevated auxiliary pressure acts on the switching piston 31.

A further modification with respect to the construction illustrated in FIG. 1 resides in the fact that a further valve 34a is provided in the construction of FIG. 2, the valve 34a serving for the reduction or depletion of the pressure which remains in the auxiliary energy supply conduit 25a after the termination of an antiskid control operation, the valve 34a not being structurally united with the master cylinder 2a. As far as its construction is concerned, the valve 34a is similar or identical to the separating valve 24 or the return valve 27 of FIG. 1; it includes a switching piston 37 having a conical valve end, the switching piston 37 being urged by a compression spring 38 in such a manner that the return conduit branch 35 leading to the return conduit 28 is closed under normal circumstances. The internal space of the valve 34a which accommodates the compression spring 38 is connected, via a conduit branch 36, with the first brake conduit 20.

When the brake pedal 3 is depressed, the operation of the wheel brake actuating cylinders 5 to 8 is controlled in two separate braking circuits in a static manner, in that the valve units 30 as well as the further valve 34a assume their illustrated positions.

During an antiskid control operation, an electric motor which drives the hydraulic pump 11 is energized, so that the hydraulic pump 11 starts pumping pressurized auxiliary hydraulic fluid into the auxiliary energy supply conduit 25a. The one-way or check valves 26 cause the pressure in the auxiliary energy supply conduit 25a, and thus in the inner spaces of the valve 34a and of the valve unit 30, to rise to a level at which the pistons 31 of the valve unit 30 are switched into their other end positions. On the other hand, since the brake pedal 3 remains depressed during the antiskid control operation, the piston 37 remains in its illustrated position because of the pressure from the master cylinder device 2 which is supplied thereto through the braking conduit 20 and the branch conduit 36. The auxiliary energy hydraulic fluid propagates through the check valve 26 to the wheel brake actuating cylinders 5 to 8 to be used for controlling the operation thereof in a dynamic manner. When the antiskid control operation is terminated, the hydraulic pump 11 is switched off and the valve units 30 return into their illustrated initial positions so that the braking system can again be operated in a static manner.

When the brake pedal 3 is completely released, there is no longer any elevated pressure in the conduit branch 36 so that the piston 37 of the valve 34a is urged towards its closing position only by the force of the relatively weak compression spring 38. Thus, any elevated pressure which persists in the auxiliary energy supply conduit 25a after the termination of the antiskid control operation will displace the piston 37 of the valve 34a into its open position to be relieved into the return conduit branch 35.

Figure 3:
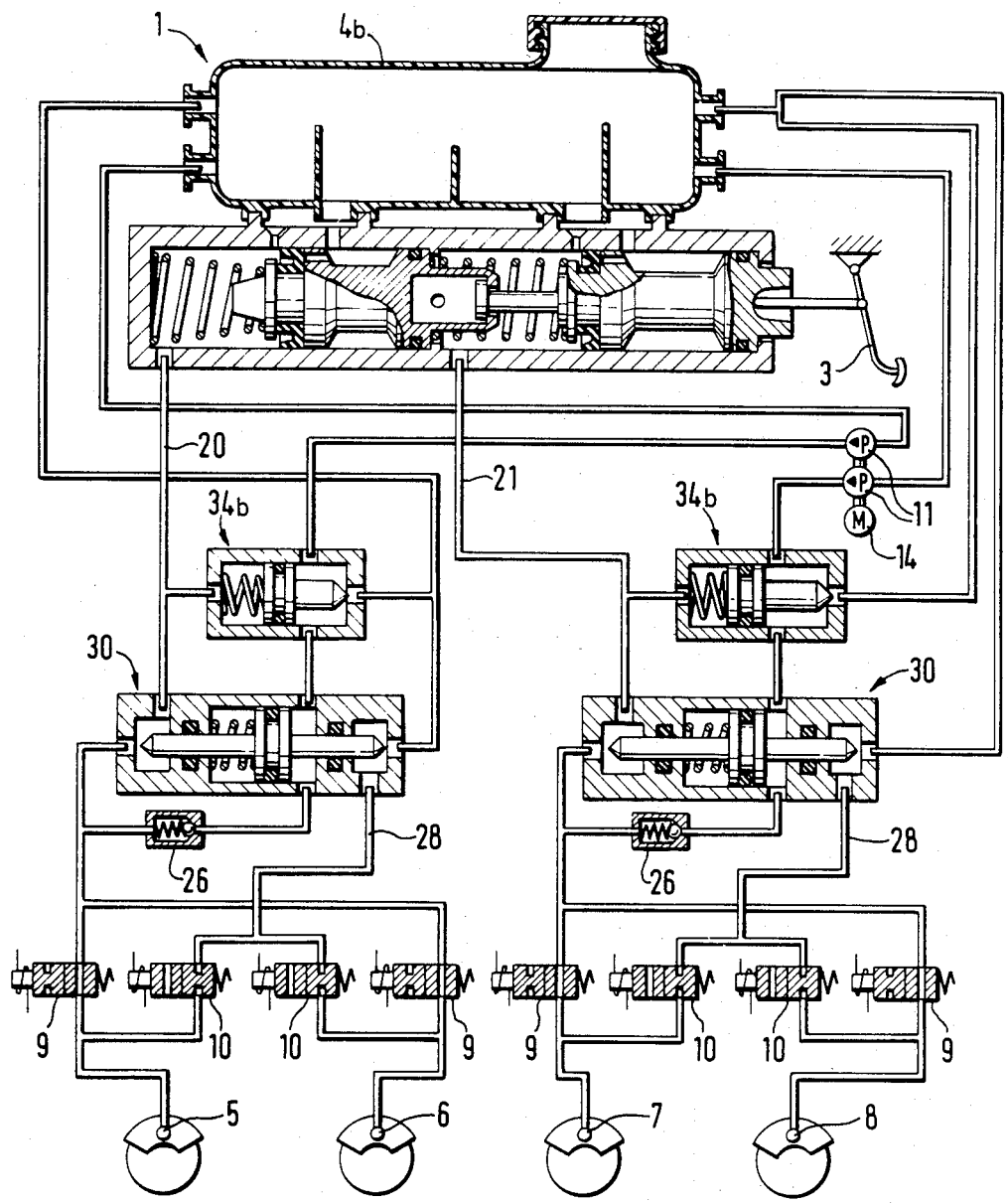
FIG. 3 is a view similar to FIG. 2 but showing a further modification.

In the construction illustrated in FIG. 3 which is similar to that discussed above in connection with FIG. 2 each of the braking circuits is provided with the valve 34a and with its own valve unit 30. The auxiliary energy supply is provided by two hydraulic pumps 11 which can be driven by a common electric motor 14 during the antiskid control operation. In all other respects, the construction of FIG. 3 is similar to that of FIG. 2, and the mode of operation is the same so that it need not be described here.

Figure 4:
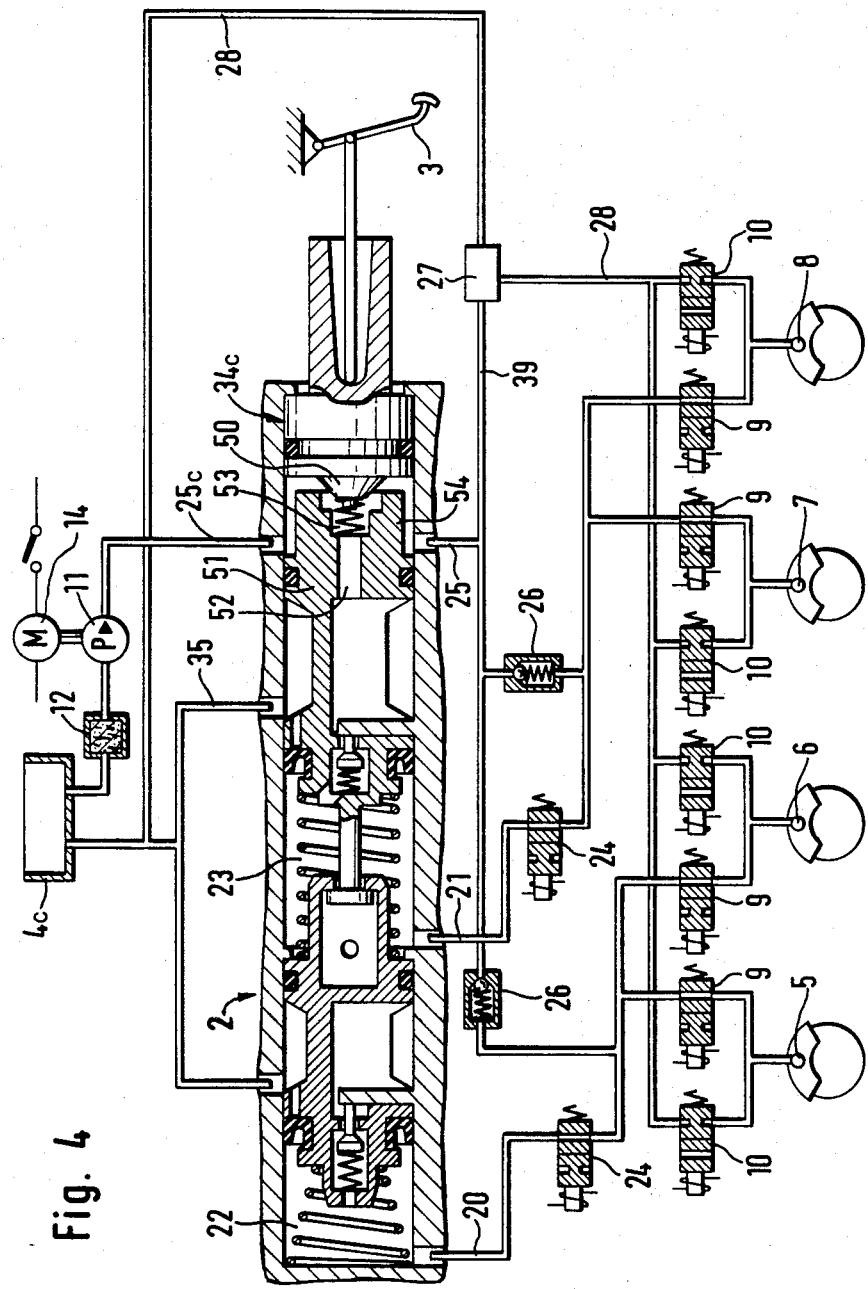
FIG. 4 is a view similar to FIGS. 1-3 but showing still another modification of the construction of the control arrangement.

The control arrangement one illustrated in FIG. 4 includes a tandem master cylinder 2 similar to that illustrated in FIG. 1. Electromagnetically operated separating valves 24 are arranged in the two braking conduits 20 and 21 to the wheel brake actuating cylinders 5, 6, 7 and 8. The valve 34a is constructed as a throttling valve and is arranged at the end of the master cylinder device 2 which is close to the brake pedal 3. That one of the pistons of the master cylinder device 2 which is closer to the brake pedal 3 is provided with a piston rod end portion 51 which has a valve seat for a frusto-conical valve part 50 which is mechanically connected with the brake pedal 3. The piston rod end portion 51 is provided with an internal longitudinally passage 52 that has an enlarged end portion at its end closer to the brake pedal 3. A compression spring 53 is accommodated in this enlarged end portion of the passage 52 and is so arranged that it urges the valve part 50 and the piston rod end portion 51 away from one another. The inner longitudinal passage 52 communicates with the return conduit branch 35 leading to the low-pressure supply reservoir 4c. The piston rod end portion 51 is provided, at its side close to the brake pedal 3, with a radial enlargement 54 that seals the piston rod end portion 51 with respect to the wall of the housing of the master cylinder device 2. The construction is such that the flow of the pressurized auxiliary hydraulic fluid through the auxiliary energy supply conduit 25c passes through the unit consisting of the throttling valve 34c and the master cylinder device 2 at the end of such unit which is closer to the brake pedal 3.

The operation of the control arrangement of FIG. 4 is as follows: when the brake pedal 3 is not depressed, the throttling valve 34c is closed, since the forces of the return springs acting on the two master cylinder pistons outweigh the force of the compression spring 53 and cause the valve seat of the piston rod end portion 51 to contact the frusto-conical part 50 of the throttling valve 34c. This means that the return conduit branch 35 is separated from the auxiliary energy supply conduit 25c. Now, when the brake pedal 3 is depressed and the braking operation is normal, that is, without antiskid control action, the closed throttling valve 34c is moved, together with the two master cylinder pistons, in the leftward direction as considered in FIG. 4, and the wheel brake actuating cylinders 5, 6, 7 and 8 are operated in a static manner due to the fact that the separating valves 24 assume their open positions. Under these circumstances, the hydraulic pump 11 is not operating. On the other hand, when there is a need for the antiskid control action, the normally open electromagnetically operated separating valves 24 are switched into their closed positions so that no static operation of the wheel brake actuating cylinders 5 to 8 is possible any longer. Simultaneously therewith, the operation of the electric motor which drives the hydraulic pump 11 is commenced so that the hydraulic pump 11 builds up auxiliary pressure in the auxiliary energy supply conduit 25c while the throttling valve 34c is closed. This auxiliary pressure propagates through the check valves 26 to the wheel brake actuating cylinders 5 to 8 to operate the same in a dynamic manner. Simultaneously therewith, the normally closed return valve 27 is switched into its open position due to the pressure of the auxiliary hydraulic fluid acting thereon. Thus, by suitably operating the electromagnetically operated control valves 9 and 10, pressure acting in the respective wheel brake actuating cylinder 5, 6, 7 or 8 which is to be controlled to avoid skidding of the associated wheel can be relieved or decreased, the excess hydraulic fluid which is discharged from the respective wheel brake actuating cylinder being returned into the low-pressure supply reservoir 4. The return valve 27 can also be operated electromagnetically.

The throttling valve 34c has the effect that no unacceptably high pressure can build up in the dynamic circuit of the auxiliary energy supply conduit 25c. This is attributable to the fact that, when the dynamic pressure generated by the hydraulic pump 11 exceeds, as to its effect, the braking pedal pressure or the static pressure in the master cylinder 2, the throttling valve 34 opens so that pressure peaks in the dynamic circuit are relieved through the inner passage 52 and the return conduit branch 35 to the supply reservoir 4c.

When the auxiliary energy source fails, the braking system is operable in the conventional manner with static operation of the wheel brake actuating cylinders 5 to 8 while the return valve 27 is closed.

Thus, there is provided a control arrangement for use in a hydraulic braking system equipped with an antiskid control device and including a master cylinder device which is operated in dependence on the travel of a brake pedal, which renders possible a static operation of the wheel brake actuating cylinders during the normal braking operation without antiskid control. During the static control of the wheel brake actuating cylinders, a return valve closes the communication through a return conduit to a low-pressure hydraulic supply reservoir. Normally open separating valves are arranged in the braking conduits to the wheel brake actuating cylinders, these separating valves closing during antiskid control operation provided that auxiliary energy is available. There is provided a conduit which supplies the auxiliary energy to the wheel brake actuating cylinders so that the latter can be operated in a dynamic manner. The normally closed return valve can be opened, either directly or indirectly, by the pressure of the auxiliary energy hydraulic fluid during the antiskid control operation, so that the pressure from the wheel brake operating cylinder to be controlled can be relieved to the low-pressure supply reservoir. The pressure of the auxiliary energy hydraulic fluid can be generated by a hydraulic pump which is operated during the antiskid control action. However, the auxiliary energy supply system can also be operated on a continuous basis, in which case the hydraulic fluid from the auxiliary energy source is supplied to the hydraulic braking circuit only when the need for an antiskid control action arises. The separating valve and the return valve can be united with one another in a single valve unit. A further valve renders it possible to relieve the remaining pressure or pressure peaks in the auxiliary energy supply system either after or during the antiskid control operation. The control arrangement of the present invention has a very compact structure and is very reliable and energy-saving in operation. A particular advantage of the control arrangement of the present invention is that it can be integrated into already existing braking system by resorting to simple refurbishing or rebuilding measures.

While we have described above the principles of our invention in connection with specific apparatus, it is to be clearly understood that this description is made only by way example and not as a limitation to the scope of our invention as set forth in the accompanying claims.

We claim:

1. A control arrangement for use in hydraulic braking system of a vehicle, particularly of a motor vehicle, equipped with an antiskid control device, for controlling the operation of at least one brake actuating cylinder interposed in a braking circuit between a supply conduit having a first and a second branch respectively communicating with a master cylinder device having at least one master piston and with an auxiliary energy pressure source at their upstream ends and merging with one another upstream of the brake actuating cylinder, said auxiliary pressure source responsive to antiskid control action for generating elevated hydraulic pressure and a return conduit connected to a supply reservoir at its downstream end, in dependence on the operation of the antiskid control device and of the auxiliary energy source, the invention comprising:
   means for hydraulically separating the brake actuating cylinder from the master cylinder device during antiskid control action, including a hydraulically operated separating valve interposed in the first branch of the supply conduit and assuming its open position in the absence of antiskid control action and its closed position during antiskid control action and when the auxiliary energy source is operational in response to elevated hydraulic pressure; and
   means for hydraulically connecting the brake actuating cylinder to the auxiliary energy source during antiskid control action, including a check valve interposed in the second branch of the supply conduit and assuming its open position when the pressure prevailing upstream thereof exceeds that prevailing downstream of the same.

2. The control arrangement as defined in claim 1, and further comprising means for controlling the flow of hydraulic fluid through the return conduit, including a return valve interposed in the return conduit and assuming its open position only when the auxiliary energy source is operational and at least during antiskid control action.

3. The control arrangement as defined in claim 2, and further comprising means for directly subjecting said return valve to the pressure of the auxiliary energy source at least during antiskid control action.

4. The control arrangement as defined in claim 2, and further comprising means for indirectly subjecting said return valve to the pressure of the auxiliary energy source at least during antiskid control action.

5. The control arrangement as defined in claim 4, wherein said return valve is an electromagnetically operable valve; and wherein said indirectly subjecting means is operative for operating said electromagnetically operable return valve in dependence on the pressure supplied by the auxiliary energy source.

6. The control arrangement as defined in claim 2; and further comprising a hydraulic pump having an input communicating with the supply reservoir and an output communicating with the auxiliary pressure source.

7. The control arrangement as defined in claim 6; and further comprising means for operating said hydraulic pump only during antiskid control action.

8. The control arrangement as defined in claim 6 for use in a vehicle having additonal hydraulically operated equipment in addition to the hydraulic braking system; and further comprising means for connecting said output of said hydraulic pump to such additional hydraulically operated equipment.

9. The control arrangement as defined in claim 2 for use in a hydraulic braking system including at least one additional braking circuit similar to the one braking circuit and incorporating at least one additional brake actuating cylinder and in which the master cylinder device is constructed as a tandem master cylinder; further comprising an additional separating valve similar to said separating valve of the one braking circuit and interposed in the additional braking circuit.

10. The control arrangement as defined in claim 9 for use in a hydraulic braking system in which the return conduits merge upstream of the supply reservoir into a common return conduit section; wherein said return valve is interposed in the common return section.

11. The control arrangement as defined in claim 9; and further comprising an additional return valve similar to said return valve and interposed in the return conduit of the additional braking circuit.

12. The control arrangement as defined in claim 2, wherein said separating valve includes a housing having a valve seat and a spring-loaded piston movable accommodated in said housing and having one end portion of a substantially conical configuration cooperating with said valve seat to form a conical valve therewith.

13. The control arrangement as defined in claim 2, wherein said return valve includes a housing having a valve seat and a spring-loaded piston movably accommodated in said housing and having one end portion of a substantially conical configuration cooperating with said valve seat to form a conical valve therewith.

14. The control arrangement as defined in claim 2, wherein said separating and return valves are integrated in a common valve unit.

15. The control arrangement as defined in claim 14, wherein said valve unit includes a housing having two oppositely situated valve seats, and a single spring-loaded valve member movably accommodated in said housing and having two end portions each having a substantially conical configuration and cooperating with one of said valve seats to form a conical valve therewith.

16. The control arrangement as defined in claim 2; and further comprising a switching valve interposed between an upstream and a downstream section of the second branch of the supply conduit and having a return port connected to the supply reservoir, said switching valve being movable between a first position in which it establishes communication between the sections and a second position in which it establishes communication between the upstream section and said return port.

17. The control arrangement as defined in claim 16; and further comprising means for holding said switching valve in said second position thereof during braking action.

18. The control arrangement as defined in claim 17, wherein said switching valve is integrated into the master cylinder device and includes a conical valve member movable relative to the master piston towards its second position in response to movement of the master piston out of its rest position.

19. The control arrangement as defined in claim 17, wherein said switching valve is a separate hydraulically operable valve; and further comprising means for admitting hydraulic fluid from the master cylinder device to said hydraulically operable valve for urging the latter toward its second position in dependence on the pressure prevailing in the former.

20. The control arrangement as defined in claim 19, wherein said hydraulically operable valve includes a housing having a valve seat and a switching piston movably accommadated in said housing and having one end portion of a substantially conical configuration cooperating with said valve seat to form a conical valve therewith.

21. The control arrangment as defined in claim 20, and further comprising a spring urging said switching piston of said switching valve toward said second position thereof.

22. The control arrangement as defined in claim 19 for use in a hydraulic braking system including at least one additional braking circuit similar to the one braking circuit and incorporating at least one additional brake actuating cylinder, in which the master cylinder device is constructed as a tandem master cylinder, and in which a separate auxiliary energy source is provided for each of the braking circuits; further comprising a separate hydraulic pump for each of the braking circuits interposed between the supply reservoir and the respective auxiliary energy source; and an additional switching valve similar to said switching valve and interposed in the additional braking circuit.

23. The control arrangement as defined in claim 22 for use in a hydraulic braking system operated by a brake pedal disposed at one end of the master cylinder device, wherein said switching valve is integrated into the master cylinder device at the one end thereof and is constructed as a pedal-actuatable throttling valve.

24. The control arrangement as defined in claim 24, wherein said return port includes a passage in the master piston having an end facing toward the brake pedal and means for communicating said passage with the supply reservoir; and wherein said throttling valve includes a valve seat at said one end of said passage and a throttling valve member mechanically connected to the brake pedal and movable toward and away from said valve seat in dependence on the brake pedal travel.

25. The control arrangement as defined in claim 24, wherein said throttling valve member has a portion of a substantially frusto-conical configuration cooperating with said valve seat.

26. The control arrangement as defined in claim 24; and further comprising spring means for urging said throttling valve member away from said valve seat.

27. The control arrangement as defined in claim 24, wherein the master cylinder device has a bore accommodating the master piston and said throttling valve member; and wherein said communicating means of said return port includes means for defining in said bore a switching compartment receiving said throttling valve member and a return compartment situated at the other end of said passage, including an extension of the master piston toward said throttling valve member having an enlarged end portion sealingly separating said compartments from one another and provided with said passage.

28. The control arrangement as defined in claim 16; and further comprising means for holding said switching valve in said first position thereof so long as the pressure prevailing in the master cylinder device exeeds the pressure of the auxiliary energy source.

* * * * *